Feb. 4, 1936.　　　K. MORSBACH　　　2,029,736
MOTION PICTURE CAMERA
Filed Aug. 4, 1932
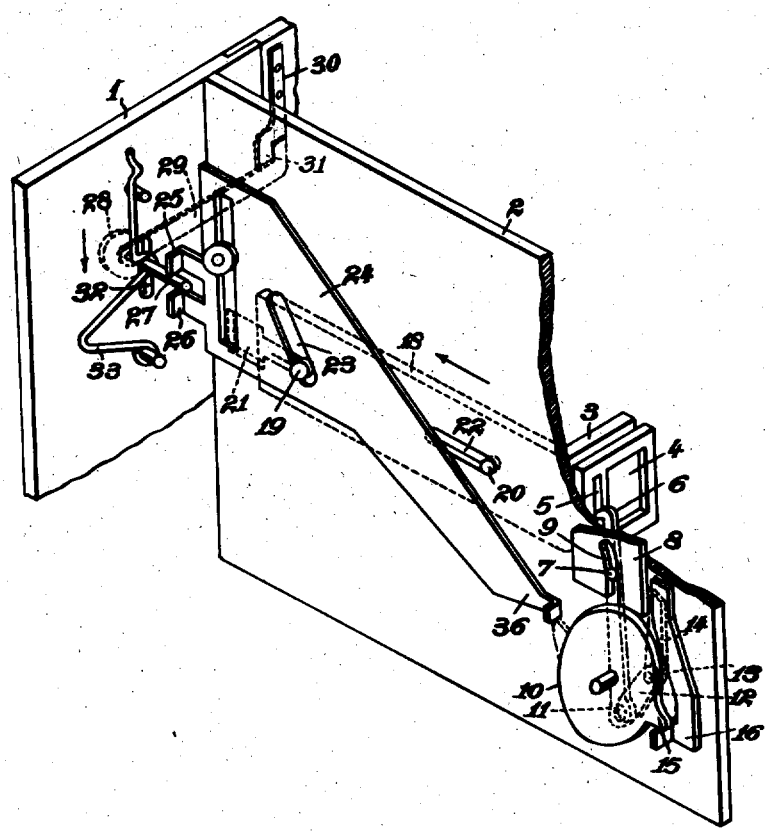
Inventor:
Kurt Morsbach
by
Litke & Kehlenbeck
Attorneys Patented Feb. 4, 1936

2,029,736

UNITED STATES PATENT OFFICE 2,029,736

MOTION PICTURE CAMERA

Kurt Morsbach, Berlin-Grunewald, Germany

Application August 4, 1932, Serial No. 627,490
In Germany August 4, 1931

3 Claims. (Cl. 88—17)

My invention relates to motion picture cameras.

One object of my invention is to so arrange, shape or equip movable or adjustable parts of the camera, and more particularly such parts which must be brought into position to get the camera ready for taking pictures, that they are able to engage parts of the driving means and thus prevent the operation of the driving means or the feeding of the film when the camera is released.

My invention prevents the camera driving means from being started or released for taking pictures unless one or a plurality of the said parts is or are in working position since in such a case it is only possible to take defective pictures.

Particularly useful is an equipment according to my invention in conjunction with the film guiding parts, because if the film is incorrectly guided the hook or pin mechanism for pulling the film intermittently past the window cannot feed the film properly and will destroy the perforations in or the sensitized layer on the film. My invention extends therefore more particularly to such parts which are of importance for the correct positioning of the film within the camera. For this purpose a locking or arresting member is connected with one or more of these parts, by which member a release or starting of the camera is prevented.

In a particularly simple manner one of the said mechanisms may be applied to a camera, the film guiding parts of which are automatically brought into the correct position within the camera by operating the cover locking button or knob and, by having the said button or knob connected to only one of the film guiding parts which are adapted to be adjusted together or formed as a part of one of them. As long as the cover locking means of the camera is not in operative position in the closed position of the cover the release or starting of the camera is prevented.

In the drawing affixed to my specification and forming part thereof an embodiment of my invention is shown applied to a camera in which the film channel or gate is automatically closed on locking the cover of the camera.

Referring to the drawing, 1 indicates the cabinet or case of the camera and 2 a vertical partition wall located inside the camera upon which is mounted the presser plate 3 of the film channel or guideway and opposite to which is located the film window or aperture 4.

Adjacent to the film window there is provided a slot 5 through which projects the hook 6 for intermittently pulling the film forward. The hook 6 is guided by means of a pin 7, in a plate 8 provided with a slot 9 adapted to control the movement of the hook. The hook 6 is actuated by a disk 10 driven by driving gear not shown in the drawing, said hook 6 being connected with said disk 10 by means of a crankpin 11. Upon the crankpin 11 is rigidly mounted a crank 12 which carries a further crankpin 13 upon which is pivoted the connecting rod 14 for the camera shutter.

The disk 10, adapted to be driven by the driving gear, is provided on its periphery with a projection or tooth 15 adapted to be engaged by a detent or pawl 16 which can be thrown out of engagement with the projection by moving a suitable releasing means with which the camera is provided. After the release the disk 10 revolves under the action of the driving gear and drives the hook 6 and the shutter by means of the connecting rod 14.

The presser plate 3 is mounted on or forms part of a bar or rail 18. On the bar 18 are fixed pins 19 and 20 which project through slots 21 and 22 in the partition wall 2, so that the bar is guided along the wall. The protruding end of the pin 19 is engaged by an oblique slot 23 in a slide 24. The slide is provided at the forward end with extensions 25 and 26 bent at right angles. Between these extensions projects a pin 27. The pin 27 is fixed to the operating knob 28 of the lock of the cover. The lock of the cover consists of a hook 29 connected with the knob 28 which hook in its turn engages a further hook 31 fixed to the cover 30.

The knob 28 is guided, by means of its pin 27, in a slot 32 provided in the wall 1 of the camera cabinet. In consequence of this vertical guidance the pin 19 engaging the oblique slot 23 is horizontally displaced so that the bar 18 with the presser plate 3 likewise develops a horizontal movement in one direction or the other, according to whether the lock 29, 31 is open or closed. When opening the lock, i. e. when pushing the knob 28 down, the film channel is opened so that the film may be inserted, while after the film has been inserted and the cover of the camera locked again by pushing the knob 28 upwards the film channel is closed again.

In order to avoid the possibility that with the film channel open, i. e. with the presser plate 3 lifted off, and with the knob 28 in the open position, the driving gear might be released with the cover 30 itself closed or folded down, the slide 24 is provided with an extension 36 bent at its end at right angles, which when the film channel is open extends into the path of the projection 15 of the disk 10, so that when the detent 16 is withdrawn the projection or tooth 15 on the disk 10 can only turn until it reaches the stop 36. This angular movement of the disk 10 may, by means of a suitable arrangement, be made so small that the film is not fed forward or that the part revolution merely causes an idle stroke of the intermittent feed mechanism. The operator knows at once from the relatively quick stoppage of the driving gear that the camera is not in order and is able to correct the fault; in the example under consideration this can easily be effected by closing the lock of the cover whereby the film channel is closed simultaneously. The stop 36 then returns into position out of the path of the projection 15 and the disk 10 continues to revolve provided the detent 16 has been moved back into the inoperative position.

It will be readily understood that structural changes and modifications may be made within the ambit of the appended claims without departing from the spirit of my invention.

What I claim as new and desire to protect by Letters Patent is:

1. In a motion picture camera, the combination of two members forming a film guide, one of said members being movable relatively to the other from an operative to an inoperative position, film-feeding means, power actuated driving means including a rotatable projection for transmitting motion to said film-feeding means, and a detent connected with the movable member of the film guide and adapted, when said movable member is adjusted to its inoperative position, to extend into the path of said rotatable projection to prevent the transmission of a feeding motion to the film-feeding means as long as said movable member is not in its operative position.

2. In a motion picture camera, the combination of two members forming a film channel, one of said members being movable relatively to the other from an operative to an inoperative position, film-feeding means, a power actuated driving member for transmitting motion to said film-feeding means, a projection on said driving member, a pawl cooperating with said projection to prevent operation of said driving member, a movable releasing member for operating said pawl to release said driving member, and a detent connected with the movable member of said film channel and adapted to project into the path of said projection when said movable member moves from its operative position.

3. A motion picture camera having a casing provided with a cover, means for locking the cover in its closed position, a film guide consisting of two members, one of said members being movable relatively to the other from an operative to an inoperative position, a slide for operating said movable member, an operative connection between said cover locking means and said slide whereby an unlocking operation of said cover locking means automatically adjusts said movable member to its inoperative position, film-feeding means, a driving member for transmitting motion to said film-feeding means, a projection on said driving member, a pawl cooperating with said projection to prevent operation of said driving member, a movable releasing member for operating said pawl to release said driving member, and a detent connected with said slide and adapted to project into the path of said projection when said movable member moves from its operative position.

KURT MORSBACH.